United States Patent Office 3,377,358
Patented Apr. 9, 1968

3,377,358
3,3-DIALKOXYTHIETANE-1,1-DIOXIDES AND THEIR PREPARATION
James C. Martin, Kingsport, Tenn., assignor to Eastman Kodak Company, Rochester, N.Y., a corporation of New Jersey
No Drawing. Continuation of application Ser. No. 276,161, Apr. 29, 1963. This application Feb. 13, 1967, Ser. No. 615,849
7 Claims. (Cl. 260—327)

ABSTRACT OF THE DISCLOSURE

The invention relates to 3,3-dialkoxy-thietane-1,1-dioxides and their preparation, useful as dye intermediates and solvents.

This application is continuation of my copending application Ser. No. 276,161, filed Apr. 29, 1963, now abandoned.

This invention relates to novel organic compounds and more particularly to 3,3-dialkoxythietane-1,1-dioxides and to a method for preparing them. The compounds of the invention have the general formula:

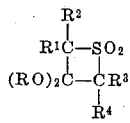

The substituents R, taken singly, are lower alkyl radicals, e.g., methyl, ethyl, propyl, butyl, t-butyl, etc., and, taken collectively, represent an alkylene radical as derived from an alkylene glycol of 2 to about 8 carbon atoms, which alkylene radical forms, with the two oxygen atoms and the carbon atom to which the oxygen atoms are attached, a heterocyclic ring having 5 to 8 ring atoms. Examples of such alkylene radicals represented by the R's taken collectively include ethylene, trimethylene, tetramethylene, pentamethylene, and the alkylene radicals derived from branched glycols such as 1,3-butylene (derived from 1,3-butanediol) and 2,2,4-trimethyl-1,3-pentylene (derived from 2,2,4-trimethylphentane-1,3-diol).

$R^1$, $R^2$, $R^3$ and $R^4$, taken singly, are hydrogen or alkyl radicals of 1 to 8 carbon atoms. Said alkyl radicals can be straight or branch chain. Any one or more of the radicals $R^1$, $R^2$, $R^3$ and $R^4$ can also be a mononuclear aryl radical with or without alkyl substituents and having up to 8 carbon atoms. $R^1$ and $R^2$, taken collectively, and $R^3$ and $R^4$, taken collectively, can be joined lower alkylene radicals which, with the common carbon atom to which they are attached, form a saturated carbocyclic group having 4 to 6 ring carbon atoms. Preferred substituents R, $R^1$, $R^2$, $R^3$ and $R^4$ include the straight and branched chain lower alkyl radicals such as methyl, ethyl, propyl and butyl.

The method of the invention, by which the novel compounds are prepared, in general comprises combining in an inert solvent an alkyl or aryl sulfonyl chloride or bromide of the formula, $R^1R^2CH-SO_2X$, where X is Cl or Br, and a ketene acetal of the formula, $R^3R^4C=C(OR)_2$, in the presence of a hydrogen halide acceptor, e.g., a tertiary amine. The resulting cycloaddition product is then isolated, e.g., by distillation or recrystallization. The reaction can be illustrated by the following equation:

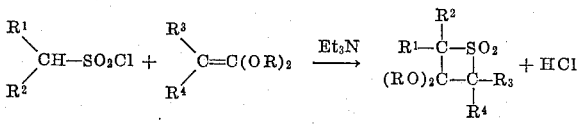

wherein the substituents $R^1$, $R^2$, $R^3$ and $R^4$ have the meanings stated above.

As indicated by the formula, $R^1R^2-CH-SO_2X$, the sulfonyl halide must have at least one hydrogen on the carbon atom adjacent to the sulfonyl atom. The sulfonyl chlorides are greatly preferred for economic reasons although for some reactions the bromides can be advantageous. Typical sulfonyl halides that are suitable include: methanesulfonyl chloride, methanesulfonyl bromide, ethanesulfonyl chloride, 2-propanesulfonyl chloride, 1-hexanesulfonyl chloride, 5-nonanesulfonyl chloride, diphenylmethanesulfonyl chloride, etc.

Ketene acetals of the formula $R^3R^4C=C(OR)_2$ which are suitable for the process of the invention are disclosed by S. M. McElvain, Chem. Rev., 45, 453 (1949). Examples include ketene dimethyl acetal, ketene diethyl acetal, ketene diphenyl acetal, ketene ethylene acetal, dimethylketene dimethyl acetal, dimethylketene ethylene acetal, diphenylketene dimethyl acetal, dichloroketene dimethyl acetal, phenylketene dimethyl acetal, cyanoketene diethyl acetal, dicarbomethoxyketene dimethyl acetal, etc.

The process requires the use of a basic material as a hydrogen halide acceptor. Generally I use a tertiary amine for this purpose. Suitable compounds include: trimethylamine, triethylamine, triethylenediamine, pyridine, quinoline, tetramethylethylene diamine, N,N'-dimethylpiperazine, N,N-dimethylaniline, picoline, lutidine, N-alkyl piperidines, N-alkyl morpholines, etc.

The process of my invention can be operated at temperatures from about —10° to 100° C. or higher. Some of the less reactive ketene acetals and sulfonyl chlorides require temperatures near the upper end of this range. Generally, I prefer to use a solvent for the process. Suitable solvents include those that do not react with the products or the starting materials. Of particular use are ethers, such as diethyl ether, diisopropyl ether, dioxane, tetrahydrofuran, 1,2-diethoxyethane, etc.

The preferred order of addition of reagents is to mix the solvent, tertiary amine and ketene acetal and to this solution add the sulfonyl chloride. Alternate methods can be used and at times are beneficial. Generally the molar ratio of sulfonyl chloride to ketene acetal is 1:1; but other combinations have been used to good advantage. The tertiary amine is generally employed in excess, ranging from 10% to several hundred percent. In fact the excess amine can be employed as the solvent since, after the stoichiometric amount of amine has combined with the HCl, the unreacted excess amine is inert.

The following examples illustrate the process and compounds of the invention.

Example 1

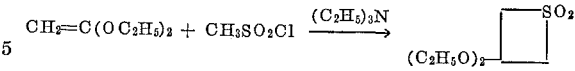

To a stirred solution of 21.0 g. (0.18 mole) of ketene diethylacetal and 35 g. (0.34 mole) of triethylamine in 200 ml. of ether was slowly added 20.6 g. (0.18 mole) of methanesulfonyl chloride. The temperature was maintained at 15–25° during the addition by use of an ice bath. The mixture was filtered to removed the triethylamine hydrochloride and the filtrate was distilled through a 6-in. Vigreux column to give 24.8 g. (71%) of 3,3-diethoxythietane-1,1-dioxide, B.P. 115–116° (0.5 mm.). This material solidified on cooling to a substance melting at 48–49.5°.

Analysis.—Calcd. for $C_7H_{14}O_4S$: C, 43.3; H, 7.3; S, 16.5. Found: C, 43.0; H,7.3; S, 16.4. The nuclear magnetic resonance of this compound was in complete agreement with the structure assigned.

Example 2

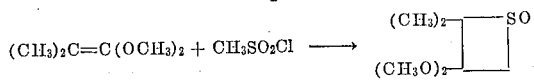

To a stirred solution of 11.6 g. of (0.1 mole) of dimethylketene dimethyl acetal and 50.5 g. (0.5 mole) of triethylamine in 100 ml. of diisopropyl ether was slowly added 11.5 g. (0.1 mole) of methane sulfonyl chloride. The temperature was maintained at 20–40° during the addition by use of an ice bath. The mixture was filtered to remove the triethylamine hydrochloride and the filtrate was distilled through a small Vigreux column to give 10.1 g. (51%) of 3,3-dimethoxy-2,2-dimethylthietane 1,1-dioxide, B.P. 104–107° (0.3 mm.).

*Analysis.*—Calcd. for $C_7H_{14}O_4S$: S, 16.5. Found: S, 16.3.

Example 3

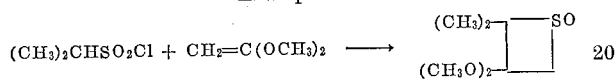

To a stirred, refluxing solution of 7.2 g. (.05 mole) of 2-propane sulfonyl chloride and 5.6 g. (.05 mole) of triethylenediamine in 100 ml. of tetrahydrofuran was added 4.4 g. (.05 mole) of ketene dimethyl acetal. Refluxing was continued for 3 hrs. after the addition. The mixture was cooled, filtered and the filtrate was evaporated under vacuum. The infrared spectrum of the residue oil was identical to that of the product obtained in Example 2 showing this material to be 3,3-dimethoxy-2,2-dimethylthietane-1,1-dioxide.

Example 4

Under the general conditions of Example 3 the following sulfonyl chlorides and ketene acetals give the 3,3-dialkoxythietane-1,1-dioxides shown:

| Sulfonyl Chloride | Ketene Acetal | Product |
|---|---|---|
| $C_8H_{17}SO_2Cl$ | $C_6H_5CH{=}C(OCH_3)_2$ | 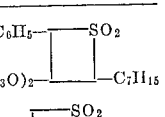 |
| 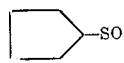 | 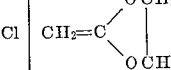 | 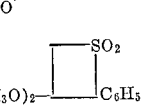 |
| $C_6H_5CH_2SO_2Cl$ | $CH_2{=}C(OCH_3)_2$ | 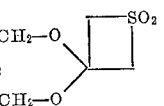 |
| $CH_3SO_2Cl$ | 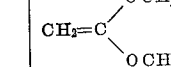 | 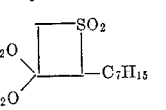 |
| $C_8H_{17}SO_2Cl$ | 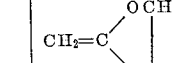 | 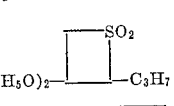 |
| $C_4H_9SO_2Cl$ | $CH_2{=}C(OC_2H_5)_2$ | 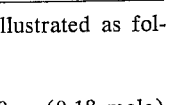 |

Other suitable process variables are illustrated as follows:

Example 5

To a stirred, refluxing solution of 21.0 g. (0.18 mole) of ketene diethylacetal and 37.0 g. (0.2 mole) of tributylamine in 100 ml. of dioxane is added a solution of 20.6 g. (0.18 mole) of methanesulfonyl chloride in 40 ml. of dioxane over a period of 20 min. Refluxing is continued for 1 hr. The reaction mixture is cooled, filtered and the filtrate distilled to give 3,3-diethoxythietane-1,1-dioxide.

The compounds of the invention are useful as chemical intermediates. For example, by heating in dilute aqueous solution of a mineral acid they can be hydrolyzed to 3-thietanone 1,1-dioxides, as disclosed in my copending United States application Ser. No. 274,850, filed Apr. 22, 1963 entitled "3-Thietanone 1,1-Dioxides." The latter compounds are also valuable chemical intermediates. They can be combined with so-called I.C.I. intermediates to form cyanine dyes useful as photographic spectral sensitizing dyes and with alcohols to form aliphatic alkyl sulfonyl esters useful as dye intermediates, all of which is disclosed in said copending application.

The compounds of the invention are also useful as solvents. For instance they will dissolve polyacrylonitrile, a difficult substance to dissolve.

The invention has been described in considerable detail with particular reference to certain preferred embodiments thereof, but it will be understood that variations and modifications can be effected within the spirit and scope of the invention as described hereinabove, and as defined in the appended claims.

I claim:

1. A compound of the formula

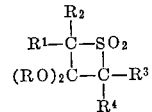

wherein:
(a) the substituents R, taken singly, are lower alkyl radicals and, taken collectively, represent an alkylene radical of 2 to 8 carbon atoms which with the two oxygen atoms to which it is attached and the carbon atom to which the latter are attached, form a heterocyclic ring having 5 to 8 ring atoms;
(b) $R^1$, $R^2$, $R^3$ and $R^4$, taken singly, are selected from the group consisting of hydrogen, an alkyl radical of up to 8 carbon atoms, and a mononuclear aryl radical of up to 8 carbon atoms; and,
(c) $R^1$ and $R^2$, taken collectively, and $R^3$ and $R^4$, taken collectively, are joined lower alkylene radicals which with the carbon atom to which they are attached, form a saturated carbocyclic group having 4 to 6 ring carbon atoms.

2. The compound according to claim 1 which is 3,3-diethoxythietane 1,1-dioxide.

3. A compound according to claim 1 which is 3,3-dimethoxy-2,2-dimethylthietane 1,1-dioxide.

4. The method of producing a compound of the formula

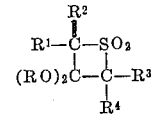

which comprises combining a sulfonyl halide of the formula, $R^1R^2CH$—$SO_2X$, and a ketene acetal of the formula, $R^3R^4C{=}C(OR)_2$, at a temperature of about −10 to 100° C. in an inert solvent and in the presence of a tertiary amine; wherein:
(a) the substituents R, taken singly, are lower alkyl radicals and, taken collectively, represent an alkylene radical of 2 to about 8 carbon atoms which with the two oxygen atoms to which it is attached and the carbon atom to which the latter are attached, form a heterocyclic ring having 5 to 8 ring atoms;
(b) $R^1$, $R^2$, $R^3$, and $R^4$, taken singly, are selected from the group consisting of hydrogen, alkyl radicals of up to 8 carbon atoms, and mononuclear aryl radicals up to 8 carbon atoms;
(c) $R^1$, and $R^2$, taken collectively, and $R^3$ and $R^4$, taken collectively, are joined lower alkylene radicals which with the carbon atom to which they are attached, form a saturated carbocyclic group having 4 to 6 carbon atoms; and (d) X is selected from the group consisting of Cl and Br.

5. A method according to claim 1 of producing 3,3-dimethoxy-2,2-dimethylthientane-1,1-dioxide which comprises combining methane sulfonyl chloride with ketene diethylacetal at a temperature from about −10° to 100° C. in an inert solvent and in the presence of a tertiary amine.

6. A method according to claim 1 of producing 3,3-dimethoxy-2,2-dimethylthietane-1,1-dioxide which comprises combining methane sulfonyl chloride with dimethylketene dimethyl acetal at a temperature from about −10° to 100° C. in an inert solvent and in the presence of a tertiary amine.

7. A method according to claim 1 of producing 3,3-dimethoxy-2,2-dimethylthietane-1,1-dioxide which comprises combining 2-propane sulfonyl chloride with ketene dimethyl acetal at a temperature from about 10° to 100° C. in an inert solvent and in the presence of a tertiary amine.

References Cited

Truce et al.: Jour. Amer. Chem. Soc., vol. 84 (1962), pp. 3030–1.

JAMES A. PATTEN, *Primary Examiner.*

UNITED STATES PATENT OFFICE
CERTIFICATE OF CORRECTION

Patent No. 3,377,358                                   April 9, 1968

James C. Martin

It is hereby certified that error appears in the above numbered patent requiring correction and that the said Letters Patent should read as corrected below.

Column 1, line 43, "2,2,4-trimethylphentane-1,3-diol" should read -- 2,2,4-trimethylpentane-1,3-diol --. Column 2, line 15, "45" should read -- 45 --. Column 3, lines 2 to 4, and lines 18 to 21, the right-hand portion of the formulas, each occurrence, should read

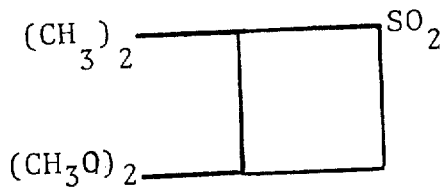

Column 5, line 4, "3,3-dimethoxy-2,2-dimethylthientane-1,1-dioxide" should read -- 3,3-diethoxythietane-1,1-dioxide --. Column 6, line 4, "10°" should read -- -10° --.

Signed and sealed this 11th day of November 1969.

(SEAL)
Attest:

EDWARD M. FLETCHER, JR.
Attesting Officer

WILLIAM E. SCHUYLER, JR.
Commissioner of Patents